March 24, 1942.  R. A. SCHULTZ ET AL  2,277,369
FRONT WHEEL DRIVE MECHANISM
Filed Aug. 10, 1939  4 Sheets-Sheet 1

INVENTORS
Richard A. Schultz
Carl L. Schultz
Alphonse F. DeVriendt
BY
G. F. Hauke
ATTORNEY.

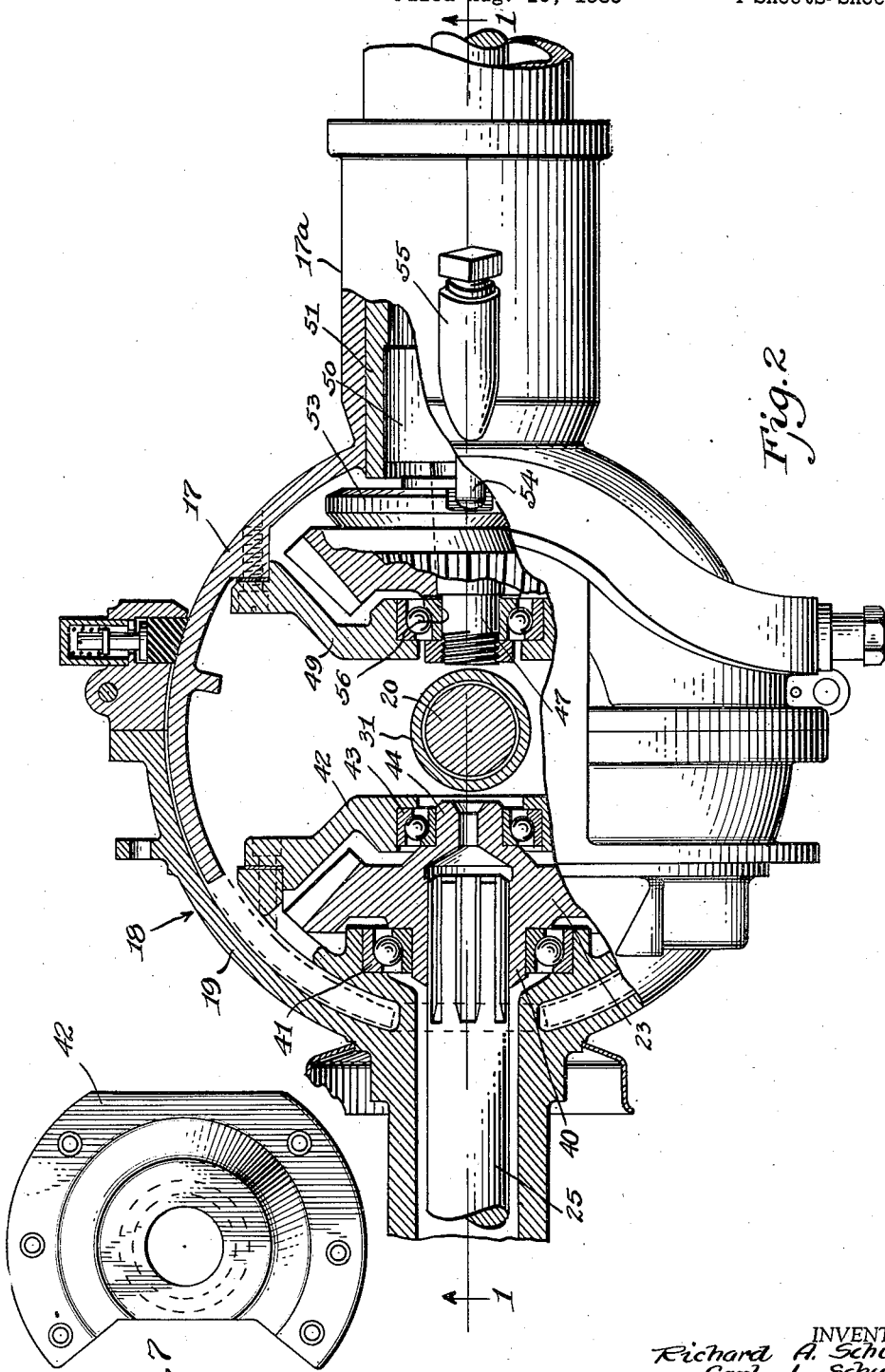

March 24, 1942.  R. A. SCHULTZ ET AL  2,277,369
FRONT WHEEL DRIVE MECHANISM
Filed Aug. 10, 1939  4 Sheets-Sheet 3
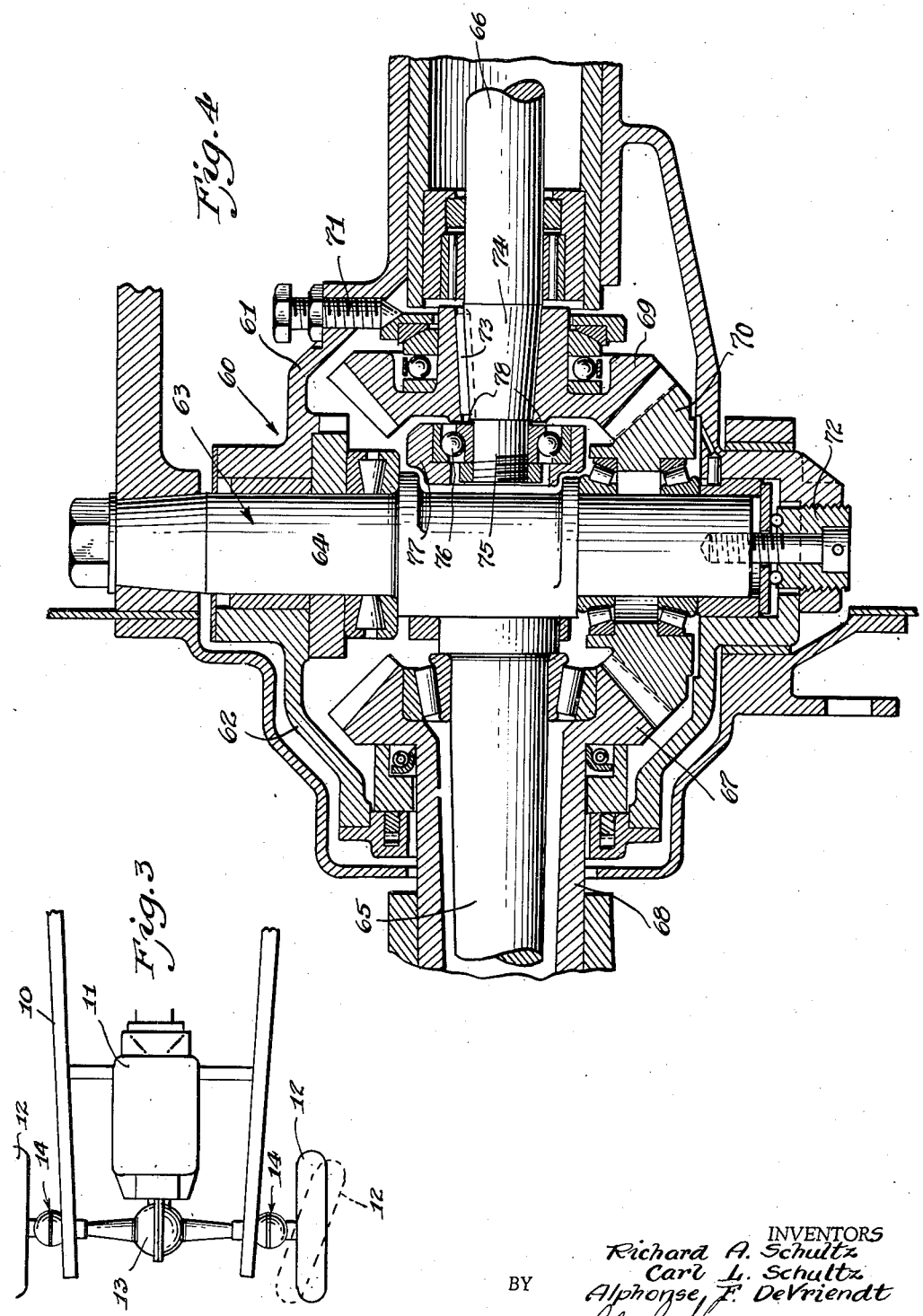
INVENTORS
Richard A. Schultz
Carl L. Schultz
Alphonse F. DeVriendt
BY
G. F. Haukel ATTORNEY.

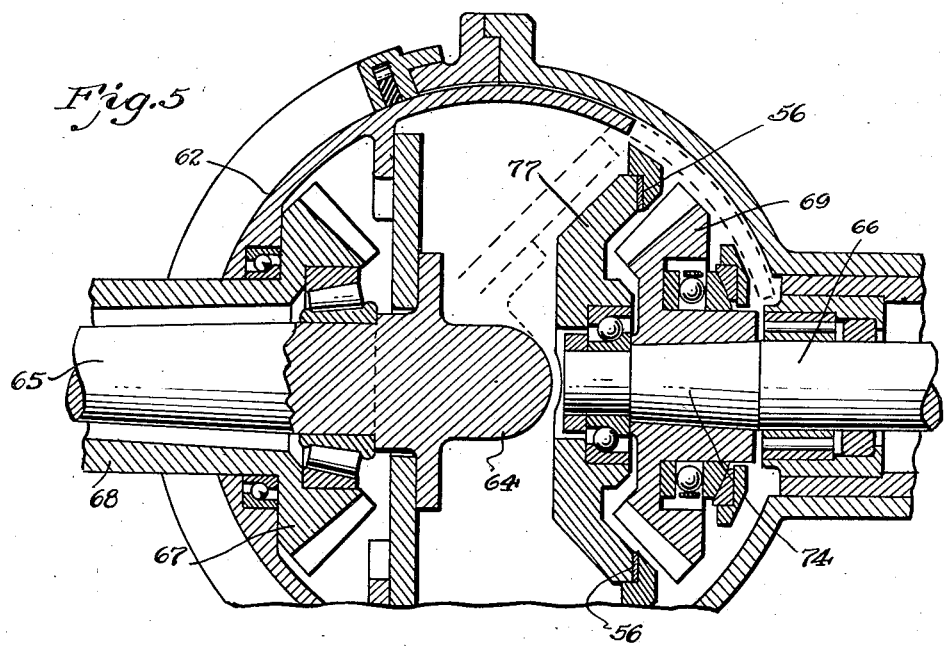
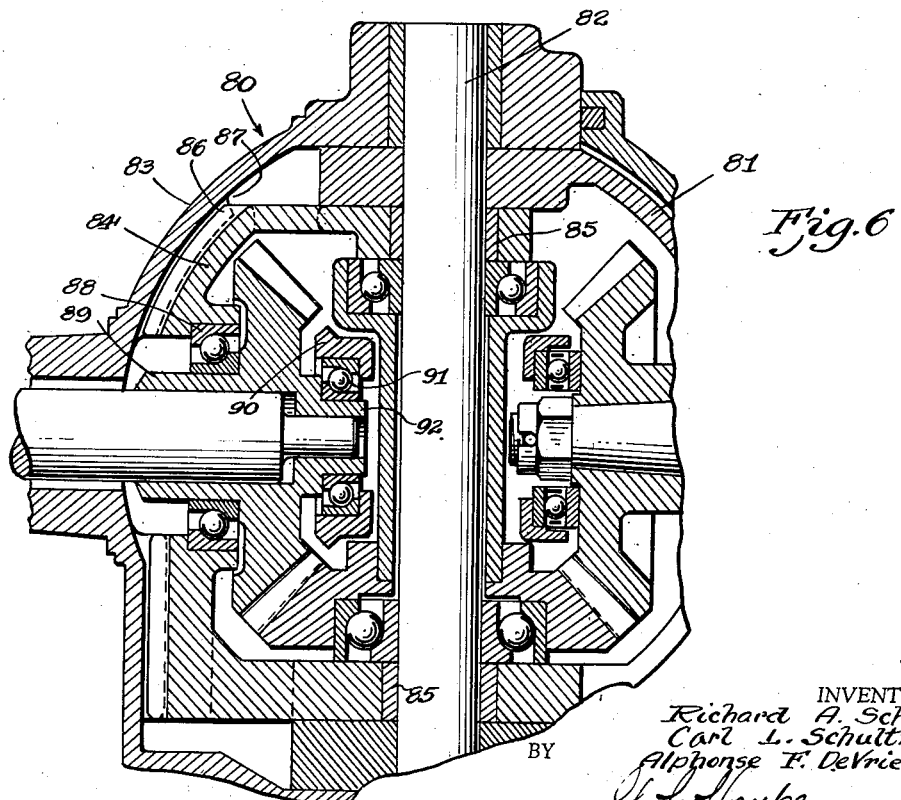

Patented Mar. 24, 1942

2,277,369

UNITED STATES PATENT OFFICE 2,277,369

FRONT WHEEL DRIVE MECHANISM

Richard A. Schultz, Roseville, Carl L. Schultz, Grosse Pointe Park, and Alphonse F. De Vriendt, Detroit, Mich., assignors, by mesne assignments, to Friend Motor Company, St. Clair Shores, Mich., a corporation of Michigan Application August 10, 1939, Serial No. 289,430

13 Claims. (Cl. 180—43)

This invention relates to a front wheel drive assembly and more particularly to an improved construction embodying features which aid in the manufacturing assembly and which facilitate servicing of the unit. The present construction has long life, is economical to manufacture, and can be readily and quickly adjusted to give maximum performance.

One difficulty with prior constructions employing gearing of the general type as embodied in the present construction has been with the assembly of the intermediate or idler gear, and an object of the present invention is to provide an improved construction whereby to facilitate the gearing assembly by providing piloting means for locating the intermediate or idler gear.

Another object of the invention is to improve the operating performance of a front wheel drive assembly by providing readily accessible and positive adjusting means for maintaining a positive predetermined clearance between the idler gear and said other gears.

Other objects of the present invention pertain to improved features of the construction all of which serve to provide an improved assembly, same being most compact and also of a rugged construction whereby to give long life with a minimum of maintenance.

For a more detailed understanding of the invention reference may be had to the accompanying drawings illustrating preferred embodiments of the invention, and in which:

Fig. 1 is a longitudinal sectional assembly view of one embodiment of the invention and illustrating a front wheel drive assembly having a king pin, said sectional view being taken substantially on the line 1—1 of Fig. 2, Fig. 2 is a view partly in section of the aforesaid assembly taken substantially on the line 2—2 of Fig. 1, Fig. 3 is a diagrammatic view of a vehicle showing the power plant and the front wheel drive assembly, Fig. 4 is a longitudinal sectional view of a modified construction, Fig. 5 is a fragmentary sectional view taken substantially at right angles to Fig. 4.

Fig. 6 is a fragmentary sectional view of a further modified construction, and

Fig. 7 is a detail of the inner bearing bracket employed substantially as shown in all modifications.

Figure 1:
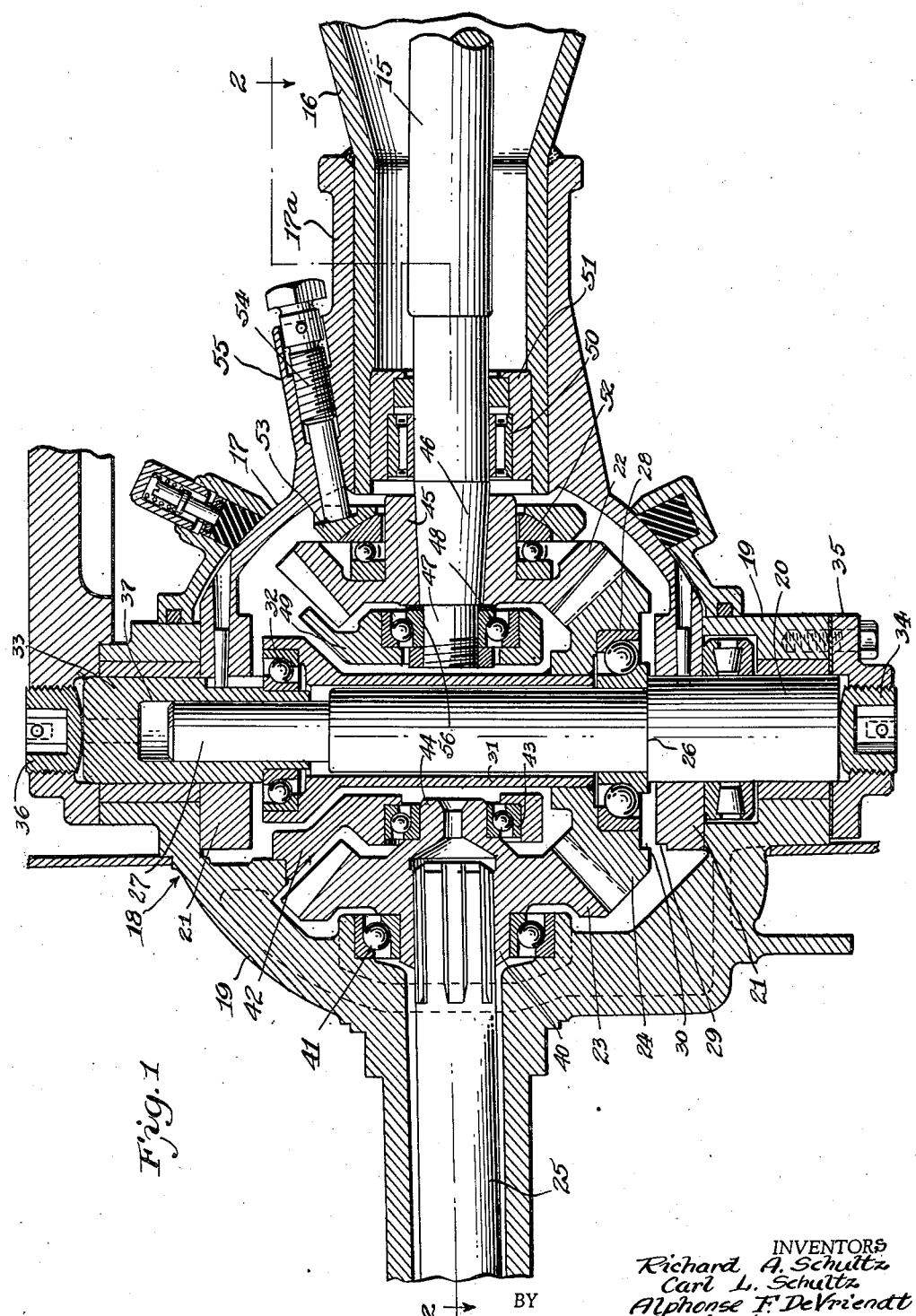

In the accompanying drawings the invention is shown in assembly with a conventional truck or other vehicle which comprises in general a chassis frame 10 which supports a power plant 11 driving the wheels 12 through a differential 13 and the conventional axles which are connected with the front wheel drive mechanisms 14 associated with the front vehicle wheels. The drive axle shafts 15 are customarily splined to the differential driven gears and are housed within an axle housing 16 to which is permanently secured the stationary part of the front wheel drive housing and designated by reference character 17. 18 designates the front wheel drive housing as a whole and this housing includes the stationary housing structure 17 and the movable housing structure 19 which is hinged to the stationary housing in a manner as is customary with constructions of this type.

In the construction shown in Figs. 1 and 2 the housing structures are hinged together by means of a king pin 20 which is supported in detachable bearing blocks 21 fixed or otherwise secured to the stationary housing structure 17. Driving and driven gears 22 and 23 respectively are supported within the housing and are drivingly connected by means of an intermediate or idler gear 24 and thus the power is transmitted from the axle 15 to the driven shaft 25 which may be connected in any suitable manner to the vehicle wheel. The king pin 20 is provided with a shoulder 26 and a reduced end portion 27, the shoulder 26 being engaged with a bearing 28 which supports the idler gear 24. The lower bearing 21 is preferably provided with a pilot 29 which consists preferably of a cylindrical boss complementary to a cylindrical recess 30 in the underneath side of the intermediate or idler gear 24.

On removal of the king pin 20 from the assembly, which may be done without disassembling the gears from the housing structures which support the same, the two housing structures may be separated to permit access to be had to the interior of the assembly. When this king pin is removed, the shoulder 26 is consequently withdrawn from contact with the bearing 28 and thus the support for said idler gear is removed. The idler gear is, however, axially aligned with the king pin bearings because of the piloting means above described, the idler gear being allowed to drop down onto the pilot 29 and is thus supported in alignment with the king pin bearings so that the king pin may be readily assembled again to complete the assembly of the structure.

The idler gear has secured thereto a vertically extending sleeve 31 which is constructed to surround the intermediate portion of the king pin 20 and carries on its upper end an anti-friction bearing 32 mounted on the retaining cap or king pin bearing 33.

The idler gear as shown in the present embodiment of the invention is constructed and arranged to be adjustably positioned relative to the driving and driven gears by the following devices. An adjustable nut 34 is adjustably secured in a cap 35 mounted on one of the housing structures preferably the movable housing structure 19, this adjustable plug or nut 34 engages the end of the king pin 20 and said king pin may be moved up or down depending upon the adjustment of the plug 34, and thus the shoulder 26 acts to move the idler gear into a predetermined position. This adjustment as just described serves to limit the maximum clearance between the idler gear and the driving and driven gears of the gearing assembly.

In operating a device of this character it is found that an idler gear such as herein described has a tendency to creep on to the driving and driven gears, or in other words, it tends to creep into mesh and lessen the amount of clearance between the gear teeth, thus causing undue wear and noise. A second adjusting means is provided in this improved construction for limiting the minimum clearance permissible between the gear teeth of the idler gear and the driving and driven gears. This is accomplished by providing an adjustable plug 36 which engages the recessed cap 33 and which is operable to adjust the position of the cap and thus through engagement of the anti-friction bearing 32 and sleeve 31 adjusts the idler gear by means of a force reacting against the upward push of the king pin to maintain minimum clearance between the gears. It will be noted that the reduced end portion 27 of the king pin 20 is slidably supported in the recess 37 of the bearing cap 33.

In this improved construction the front wheel drive assembly as illustrated embodies driving and driven gears and it is found preferable to positively support each of these gears by axially spaced bearing means. The driven gear 23 carries a hub 40 which is mounted in anti-friction bearings 41 carried by the housing structure 19. A spider bracket 42 is mounted in a suitable manner to a boss carried by the housing structure and bridges the driven gear 23 and carries anti-friction bearings 43 which support the inner hub 44 of said driven gear. In this way the driven gear is positively and definitely supported by a rugged bearing construction in a predetermined relationship with respect to the other parts of the mechanism. The driving gear 22 includes a hub 45 mounted on the tapered end portion 46 of the axle 15 and the inner end of the axle 15 which carries this driving gear is provided with a further extension 47 which is mounted in an anti-friction bearing 48 carried by a bracket 49 which comprises a spider or other suitable suspension carried from the stationary housing structure 17. The axle 15 is supported on the other side of the driving gear by an anti-friction bearing 50 mounted in a suitable collet 51 carried in the axle housing 16. A thrust bearing 52 is mounted on the hub 45 and is engaged with a self-aligning bearing 53 which is adjustably positioned by means of an adjusting screw 54. Preferably there are three such adjusting screws 54 provided and they are supported within a boss 55 carried by the housing structure extension 17a. These adjusting screws 54 are arranged to lie substantially at a very acute angle with respect to the axis of the axle. In other words, they are positioned to lie as close as possible in a parallel relationship with the axle axis in order to provide a maximum of efficiency for adjusting the self-aligning collar or bearing 53. By adjusting these adjusting screws 54 the driving gear may be relatively adjusted with respect to the idler gear 24 and preferably shims 56 are employed in between the anti-friction bearings 48 and the driving gear, removal of these shims permitting the driving gear to be moved closer to the idler gear.

In Fig. 4 a modified form of the invention is illustrated. In this construction the housing 60 comprises a stationary structure 61 and a movable structure 62 which structures are hinged together by means of a knuckle pin 63, this pin 63 comprising a vertical shaft portion 64 and a horizontal pinion portion 65, said latter portion being connected in driving relation in any suitable manner with the vehicle driving wheels. The drive is transmitted from axle 66 to the driven gear 67, to which is connected the driven shaft 68, by means of a driving gear 69 and idler gear 70. Adjusting screws 71 are carried by the housing structure 61 for adjustably positioning the driving gear 69 with respect to the idler gear and said idler gear is relatively adjusted with respect to the driving and driven gears by means of an adjustment 72. The specific details of these adjustments form no part of the present invention and are therefore not described in detail. This construction, however, illustrates means for supporting the driving gear 69 on the axle shaft 66, said gear being mounted and keyed as at 73 to the tapered end portion 74 of the axle. Said axle is provided with an extension 75 which is mounted to rotate in an anti-friction bearing 76 carried in a bracket 77 secured in any suitable manner to the housing structure 61. Shims 78 are preferably interposed between the anti-friction bearing 76 and the hub of the driving gear to permit relative adjustment of this driving gear in the same manner as is attained in the construction illustrated in Fig. 1.

In Fig. 6 the invention is shown in connection with a modified housing construction which housing is designated in general by the reference character 80 and comprises a stationary housing structure 81, preferably secured to the axle housing and having hinged therewith by means of a king pin 82, a movable housing structure 83. In this construction a sub-movable housing structure 84 is provided which may be constructed as a spider so that when the outer structure 83 is removed the interior gearing may be readily seen and adjustment made thereto while the mechanism is in operation. The inner housing structure 84 is mounted in a suitable bearing 85 on the king pin 82 and is provided with vertical extending ribs 86 which may be of any number as desired and which are constructed for interengagement with the inwardly extending ribs 87 carried by the outer structure 83. Thus, when the two housing structures 83 and 84 are assembled they will move as a unit because of these interengaging ribs 86—87. The inner housing structure 84 carries the anti-friction bearing 88 which supports the hub 89 of the driven gear and also has secured thereto a bracket 90 which carries an anti-friction bearing 91 supporting the inner hub portion 92 of the driven gear. It will thus be seen that the present invention provides an improved front wheel drive assembly which is of a rugged character and which is constructed and arranged to positively support the gearing and further embodies adjustment features which at all times maintain operating clearance between the gears which provide for efficient operating performance. In the present construction the gears may be adjusted from without the housing and the operation of the gears may be readily observed in operation on removal of the outer housing structure illustrated in Fig. 1, and it will be evident that the driven gear and outer housing may be easily removed from the assembly illustrated in Figs. 1 and 2 and again replaced in the exact relative position whereby to maintain the predetermined clearance between the gears. The manner of adjustment embodied in the present improved construction is an important feature of the present invention, and it is deemed to be more efficient than any devices heretofore proposed. The present construction may be economically manufactured and the assembly may be very quickly serviced with a minimum of time and expense.

It will be apparent to those skilled in the art to which the invention pertains that various modifications and changes may be made therein without departing from the spirit of the invention or from the scope of the appended claims.

We claim:

1. In a front wheel drive assembly, a housing comprising a pair of complementary relatively movable housing structures provided with aligned king pin bores, a king pin constructed to hinge said housing structures together, gearing supported within said housing and including an idler gear rotatably supported by said king pin, and permanent pilot means carried integrally by only one of said housing structures concentric with respect to said king pin bore for aligning said idler gear with said king pin.

2. In a front wheel drive assembly, a housing comprising a pair of complementary relatively movable housing structures, a king pin constructed to hinge said housing structures together, gearing supported within said housing and including an idler gear rotatably supported by said king pin, bearing means carried by both said housing structures for supporting said king pin and removable from assembly with said housing structures when disassembling said housing structures, and pilot means carried by only one of said housing structures for axially aligning said idler gear with respect to said king pin bearing means.

3. A front wheel drive assembly including a housing comprising a pair of complementary relatively movable housing structures, gearing within said housing and including a driving gear, a driven gear and an idler gear, fixed bearing means for supporting said driving and driven gears, a king pin constructed to hinge said housing structures together, bearing means for said king pin carried by both said structures, a shoulder on said king pin, an anti-friction bearing supported on said shoulder intermediate said idler gear and housing, said idler gear supported on said anti-friction bearing, and pilot means carried by one of said housing structures for aligning said idler gear with said king pin bearing means.

4. A front wheel drive assembly including a housing comprising a pair of complementary relatively movable housing structures, gearing within said housing and including a driving gear, a driven gear and an idler gear, fixed bearing means for supporting said driving and driven gears, a king pin constructed to hinge said housing structures together, bearing means for said king pin carried by both said structures, a shoulder on said king pin, an anti-friction bearing supported on said shoulder intermediate said idler gear and housing, said idler gear supported on said anti-friction bearing, and pilot means constructed to support said idler gear in axial alignment with the king pin bearing supporting means on removal of said king pin and king pin bearings.

5. A front wheel drive assembly including a housing comprising a pair of complementary relatively movable housing structures, gearing within said housing and including a driving gear, a driven gear and an idler gear, fixed bearing means for supporting said driving and driven gears, a king pin constructed to hinge said housing structures together, bearing means for said king pin carried by both said structures, a shoulder on said king pin, an anti-friction bearing supported on said shoulder, said idler gear supported on said anti-friction bearing, and means consisting of a boss carried by only one of said housing structures and constructed concentric with respect to the king pin bearing supporting means to support said idler gear in axial alignment with the king pin bearing supporting means on removal of said king pin and king pin bearing from the assembly.

6. A front wheel drive assembly including a housing comprising a pair of complementary relatively movable housing structures, gearing within said housing and including a driving gear, a driven gear and an idler gear, fixed bearing means for supporting said driving and driven gears, a king pin constructed to hinge said housing structures together, bearing means for said king pin carried by said structures, means carried by said king pin for supporting said idler gear, a sleeve extension carried by said idler gear, and bearing means carried by the upper king pin bearing means for supporting the upper portion of said sleeve.

7. A front wheel drive assembly including a housing comprising a pair of complementary relatively movable housing structures, gearing within said housing and including a driving gear, a driven gear and an idler gear, fixed bearing means for supporting said driving and driven gears, a king pin constructed to hinge said housing structures together, bearing means for said king pin carried by said structures, said idler gear having a recess concentric with the idler gear axis, means engaging said recess to axially align said idler gear with respect to said king pin bearing means, said idler gear having a sleeve extension axially aligned therewith, and means for supporting the upper end of said sleeve, said last mentioned means supported co-axially with respect to said king pin bearing means.

8. In a front wheel drive assembly, a housing comprising a pair of complementary relatively movable housing structures, a king pin constructed to hinge said housing structures together, gearing supported within said housing and including a driving gear, a driven gear and an idler gear drivingly connected with said driving and driven gears, an anti-friction bearing carried by said king pin for supporting said idler gear, means adjustably positioning said king pin to position the idler gear relative to said driving and driven gears and serving to limit the maximum clearance between the idler gear and said driving and driven gears, a king pin bearing cap adjustably supported by one of said housing structures, said king pin having a reduced end portion slidably supported in said cap, and means carried by said cap for engaging said idler gear, said cap being adjustably positioned and reacting on said idler gear to adjustably limit the minimum clearance between said idler gear and said driving and driven gears.

9. In a front wheel drive assembly, a housing comprising a pair of complementary relatively movable housing structures, means for hinging said structures together, an idler gear and driving and driven gears, and means for supporting each of said gears comprising spaced anti-friction bearing means carried by one of said housing structures and the gear supported thereby being positioned intermediate said spaced anti-friction bearing means.

10. In a front wheel drive assembly, a housing comprising a pair of complementary relatively movable housing structures, means for hinging said structures together, an idler gear and driving and driven gears, and bearing means for supporting said driving and driven gears adjacent to the axis of the housing hinge, and including bearing means respectively supported by the housing structures between the gear and axis of the housing hinge.

11. In a front wheel drive assembly, a housing comprising a pair of complementary relatively movable housing structures, means for hinging said structures together, an idler gear and driving and driven gears, means for adjustably positioning said driving gear to limit the maximum clearance between said driving gear and idler gear, said means including a thrust bearing and one or more adjusting screws engaging said thrust bearing and supported at a very acute angle with respect to the axis of rotation of said driving gear.

12. In a front wheel drive assembly, a housing comprising a pair of complementary relatively movable housing structures, means for hinging said structures together, an idler gear and driving and driven gears, one of said housing structures fixed to an axle housing, said other housing comprising a ball shaped structure movably hinged to said first housing structure and an inner spider structure supporting said driven gear, and means splining said inner spider structure to said ball shaped structure.

13. In a front wheel drive assembly, a housing comprising a pair of complementary relatively movable housing structures, means including a king pin for hinging said structures together, an idler gear and driving and driven gears, said king pin supporting said idler gear, a king pin bearing, and a pilot sleeve surrounding said king pin and carried by said king pin bearing concentric with respect to said king pin, said idler gear having a recess concentric with its axis and receiving said sleeve whereby to axially align said idler gear with the king pin bearing.

RICHARD A. SCHULTZ.
CARL L. SCHULTZ.
ALPHONSE F. De VRIENDT.